United States Patent [19]

Lyons et al.

[11] Patent Number: 4,916,101

[45] Date of Patent: Apr. 10, 1990

[54] METHOD OF PREPARING HETEROPOLYACID CATALYSTS

[75] Inventors: James E. Lyons, Wallingford; Paul E. Ellis, Jr., Downingtown; Wayne A. Langdale, Milmont Park; Harry K. Myers, Jr., Cochranville, all of Pa.

[73] Assignee: Sun Refining and Marketing Company, Philadelphia, Pa.

[21] Appl. No.: 279,903

[22] Filed: Dec. 5, 1988

[51] Int. Cl.$^4$ .................. B01J 27/18; B01J 27/182; B01J 27/185; B01J 27/188
[52] U.S. Cl. ........................... 502/209; 502/210; 502/211; 502/243
[58] Field of Search ................ 502/210, 211, 209, 243

[56] References Cited

U.S. PATENT DOCUMENTS

| 2,608,534 | 8/1952 | Fleck ........................... 502/211 |
| 4,522,934 | 6/1985 | Shum et al. .................. 502/209 |

FOREIGN PATENT DOCUMENTS 847784 9/1960 United Kingdom ............... 502/211

Primary Examiner—W. J. Shine
Attorney, Agent, or Firm—J. Edward Hess; Donald R. Johnson

[57] ABSTRACT

Polyoxoanions are converted to the corresponding heteropolyacids by conversion to their tetrabutylammonium salt followed by pyrolysis.

3 Claims, No Drawings

METHOD OF PREPARING HETEROPOLYACID CATALYSTS

This invention relates to catalyst of the heteropolyacid (HPA) or polyoxoanion (POA) types which are useful in the oxidation of alkanes. Specifically it relates to a method for converting POAs to HPAs.

CROSS REFERENCE TO RELATED APPLICATIONS

This application is related to copending application Ser. No. 076,570 filed July 20, 1987, now U.S. Pat. No. 4,803,187, and Ser. No. 254,750, filed Oct. 7, 1988, both of which are incorporated herein by reference.

BACKGROUND OF THE INVENTION

HPAs and POAs are thoroughly described in *Heteropoly and Isopoly Oxo-metalates*, Pope et al, Springer-Verlag, New York, 1983, as well as the related applications identified above. The latter applications also describe their use in alkane oxidation.

In order to clarify the terminology used in the art, consider first a specific precursor used in our invention, $H_3PW_{12}O_{40}$. Since the cations in this material are hydrogen, the compound is a heteropolyacid. If the cations are not hydrogen but are metals such as an alkali metal, potassium, sodium, or lithium, or are ammonium, as in $K_3PW_{12}O_{40}$ or $(NH_4)_3PW_{12}O_{40}$, then it is obviously no longer an acid, and is referred to as a polyoxoanion.

As described in Pope, HPAs and POAs are cage-like structures with a primary, generally centrally located atom(s) surrounded by the cage framework which contains a plurality of other metal atoms, the same or different, bonded to oxygen atoms. Since the central atom is different from the other metal atoms, it is described as "hetero". The other metal atoms are transition metals and have oxygen bonding such as

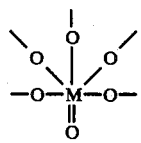

where four of the singly bonded oxygen atoms are bonded to other M atoms in the framework and the fifth is bonded to the central hetero atom.

A three-dimensional representation of a typical HPA is shown below

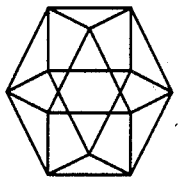

This twelve-cornered polyhedron structure is the metal atom configuration of a typical HPA described above. Between any two metal atoms is an oxygen atom, not shown, and from each metal atom is a doubly bonded oxygen, also not shown, and each of the metal atoms is bonded through oxygen to the central metal atom, not shown.

Our invention relates to HPAs (and POAs thereof) having the general formula $H_e(X_kM_nO_y)^{-e}$ where X, the central atom is preferably phosphorous, but others such as antimony, silicon, and boron are also suitable as are the generally known central atoms of HPAs, i.e., the group IIIA-VIA elements. Subscript k is preferably 1 but can be as high as 4–5. M is one or more transition metals (thus the HPA can be referred to as a transition metal HPA), usually molybdenum or tungsten, and n will vary from 5–20. Subscript y is usually 40 but can be as low as 18 or as high as 62. Notation e is the valence of the $(X_kM_nO_y)$ group and will vary from case to case, but e is always the number of H atoms needed to balance the formula. In a preferred HPA, $k=1$, $n=12$ and $y=40$ as in $H_7PMo_8V_4O_{40}$. These and similar HPAs are described in the aforesaid related applications. Most of our catalysts are of the Keggin structure and its isomers, as described in Pope, but other structures such as the Dawson structure also are suitable.

The first-mentioned related application describes the improved catalytic activity achieved by incorporating vanadium, titanium, niobium or rhenium as a portion of the M atoms in the formula described above. Thus, $H_9PW_6V_6O_{40}$ is significantly more active than $H_3PW_{12}O_{40}$ and $K_9PMo_6V_6O_{40}$ is more active than $K_3Mo_{12}O_{40}$. The number of metal atoms replaced with the promoter can be as many as 12, preferably 6–8, but can be as low as 3–6 or even 1. That application also discloses the introduction of azide into the HPA or POA, as another means of promoting the catalyst.

The other related application also discloses improving the catalytic activity of the basic HPA or POA by replacing an M=O in the framework around the central or principal metal atom with a different transition metal atom. Thus instead of $(O-)_5M=O$ at a specific site in the framework, we might have $(O-)_5M_1$ where M and $M_1$ are different metals. In terms of formula, if an Mo=O site in $K_3PMo_{12}O_{40}$ is replaced with chromium, we have $K_4PMo_{11}CrO_{39}$.

Since HPAs are acids, they have the usual properties of acids which sometimes makes their use preferable to POAs. Such an instance might arise when the oxidation is carried out in an organic solvent such as acetonitrile, for the HPA is more soluble therein than the POA. If the POA is treated with HCl to convert it to the HPA the characteristic HPA structure is sometimes degraded. Our invention avoids this problem.

SUMMARY OF THE INVENTION

The invention involves treating the POA with a tetraalkylammonium halide to form the tetraalkylammonium salt which then decomposes at elevated temperature to the HPA. The process is straightforward and can be done in readily available equipment.

DETAILED DESCRIPTION OF THE INVENTION

The first step in the method of the invention is to convert the POA to the tetraalkylammonium salt form by reaction with tetraalkylammonium halide. The POA salt will be, as noted earlier the alkali metal (sodium, potassium, lithium) or ammonium form. The alkyl group is $C_1$–$C_7$ such as methyl, ethyl, propyl, butyl, pentyl, hexyl, heptyl, isomeric forms of any of the foregoing and mixtures thereof. The preferred alkyl is n- butyl because of its ready availability. The halide is chloride, bromide, iodide or fluoride.

The basic reaction is an ordinary displacement reaction.

Thus $K_4PW_{11}VO_{40} + 4(n\text{-}C_4)_4NBR \xrightarrow{50° C.}$
     I                II $[(n\text{-}C_4)_4N]_4PW_{11}VO_{40} + 4KBr$
          III In practice, an aqueous solution of I is mixed at 50° C. with an aqueous solution of II for 15 minutes. The mixture is then refrigerated at 4° C. overnight. III crystallizes and is recovered in 70% yield by filtration.

III is then heated at 500° C. for one hour and it decomposes to the HPA. Thus $$III \xrightarrow{500° C.} H_4PW_{11}VO_{40}$$
$$\phantom{III \xrightarrow{500° C.}} IV$$

The HPA structure is confirmed by IR. Thermal gravimetric analysis during the course of the pyrolysis confirms that the tetrabutylammonium groups are eliminated under the pyrolysis conditions.

The first step of the process is generally carried out at 10°–100° C. for 0.1–10 hours, preferably 20°–60° C. for 0.1–3 hours. The thermal decomposition is normally at 100°–1000° C., preferably 200°–800° C., more preferably 300°–700° C., and for 0.1–10 hours, preferably 0.5–5 hours more preferably about 1 hour.

The displacement reaction can also be carried out without the need for refrigeration. Thus, an aqueous solution of I is mixed with a chloroform solution of II for 15 minutes. The CHCl₃ layer is separated and evaporated to dryness. The orange solid is recrystallized from a mixture of acetonitrile and methanol to yield a 70% yield of III. Decomposition of III yields IV as described above. cl EXAMPLE I 10 g. of I dissolved in 100 ml. water is mixed with 100 ml. CHCl₃ saturated with II. The mixture is stirred 15 minutes and the two layers separated. The CHCl₃ layer is evaporated to dryness and the resulting orange solid is recrystallized from a 50/50 mixture of CH₃OH and acetonitrile. Yield of III is 70%. The orange solid is then pyrolyzed at 500° C. for 1 hour under N₂ and it decomposes to $H_4PW_{11}VO_{40}$.

Alternately, the initial reaction is conducted by mixing 10 g. of I in 500 ml. water with 10 g. II in 250 ml. water for 15 minutes. The mixture is held at 4° C. for 12 hours, whereupon the crystallized III is filtered off and then pyrolyzed as before to form IV.

The above procedure is repeated with substantially the same results with the following other POAs.

$K_6PW_9M_3O_{37}$ where M = Fe, Cr, Ru $K_7PW_9M_2M'O_{37}$ where $M_2$ = Fe and M' = Fe, Zn, Co, Mn, Pd, and Pt $K_4PW_{11}MO_{39}$ where M = Fe, Co, Mn, Ru $K_5SiW_{11}FeO_{39}$ In carrying out the process, it will be observed that the POA and its tetrabutylammonium salt are usually the same color, which varies and may be red, green, orange, orange-brown, etc. The acid is usually black, because of carbon formed in the pyrolysis, but if extracted with acetonitrile, it has its own color which more often than not is the same as the POA color.

We claim:

1. Method of preparing a heteropolyacid from its ammonium or alkali metal salt, said heteropolyacid having the formula $$H_e(X_kM_nO_y)^{-e}$$

where X is a group IIIA-VIA element, M is a transition metal, k is 1–5, n is 5–20, and y is 18–62 which comprises reacting said salt with a $C_1$–$C_7$ tetraalkylammonium halide to form the tetraalkylammonium salt of said heteropolyacid, and pyrolyzing said latter salt to form said heteropolyacid.

2. Method according to claim 1 wherein said reacting is carried out at 10°–100° C. and said pyrolyzing is carried out at 300°–700° C.

3. Method according to an of claims 1 and 2 wherein said reacting is between an aqueous solution of said salt and an aqueous or organic solution of said $C_1$–$C_7$ tetraalkylammonium halide.

* * * * *